United States Patent
Kulzer

(10) Patent No.: US 11,053,829 B2
(45) Date of Patent: Jul. 6, 2021

(54) EXHAUST GAS TREATMENT SYSTEM, AND METHOD FOR HEATING AN EXHAUST GAS CATALYTIC CONVERTER

(71) Applicant: Dr. Ing. h.c. F. Porsche Aktiengesellschaft, Stuttgart (DE)

(72) Inventor: Andre Casal Kulzer, Boeblingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/816,668

(22) Filed: Mar. 12, 2020

(65) Prior Publication Data
US 2020/0291880 A1 Sep. 17, 2020

(30) Foreign Application Priority Data
Mar. 12, 2019 (DE) ...................... 10 2019 106 238.1

(51) Int. Cl.
*F01N 13/08* (2010.01)
*F01N 3/20* (2006.01)
*F02D 41/02* (2006.01)
*F01N 3/029* (2006.01)
*F01N 3/025* (2006.01)

(52) U.S. Cl.
CPC ......... *F01N 3/2033* (2013.01); *F01N 3/2006* (2013.01); *F01N 13/08* (2013.01); *F01N 3/025* (2013.01); *F01N 3/0296* (2013.01); *F01N 2240/14* (2013.01); *F02D 41/0245* (2013.01); *F02D 41/0255* (2013.01); *F02D 2200/0802* (2013.01)

(58) Field of Classification Search
CPC ...... F01N 3/025; F01N 3/0253; F01N 3/0256; F01N 3/2033
See application file for complete search history.

(56) References Cited

U.S. PATENT DOCUMENTS

| | | | | |
|---|---|---|---|---|
| 4,615,173 A | * | 10/1986 | Usui | ...................... F01N 3/0256 60/286 |
| 5,570,576 A | * | 11/1996 | Ament | ................... F01N 3/2033 60/300 |
| 2008/0163612 A1 | * | 7/2008 | Gaiser | ..................... F01N 3/025 60/299 |

(Continued)

FOREIGN PATENT DOCUMENTS

| | | | | |
|---|---|---|---|---|
| DE | 40 12 411 | | 10/1991 | |
| JP | 59158311 A | * | 10/1984 | ............. F01N 3/025 |
| KR | 20120096734 A | * | 8/2012 | |

*Primary Examiner* — Jonathan R Matthias
(74) *Attorney, Agent, or Firm* — Gerald E. Hespos; Michael J. Porco; Matthew T. Hespos

(57) ABSTRACT

An exhaust gas treatment system (10) for treating exhaust gases (12) of an internal combustion engine of a motor vehicle has an exhaust gas catalytic converter, a pipe piece (14) connected to an input side of the exhaust gas catalytic converter for feeding in exhaust gases (12) of the internal combustion engine, and a heating line (20) that opens into the pipe piece (14) for feeding heating gas (16) into the pipe piece (14) for heating the exhaust gas catalytic converter to the light-off temperature. The heating gas (16) is fed in as a vortex flow that rotates about a longitudinal axis of the pipe piece (14) to achieve homogeneous thorough mixing with the exhaust gas (12) with rapid heating across an entire cross-section of the exhaust gas catalytic converter.

11 Claims, 1 Drawing Sheet

(56) References Cited

U.S. PATENT DOCUMENTS

2012/0301365 A1\* 11/2012 Hanada ................ F01N 3/0821
  422/173
2016/0265409 A1\* 9/2016 Puschel ................ B01D 53/94

\* cited by examiner

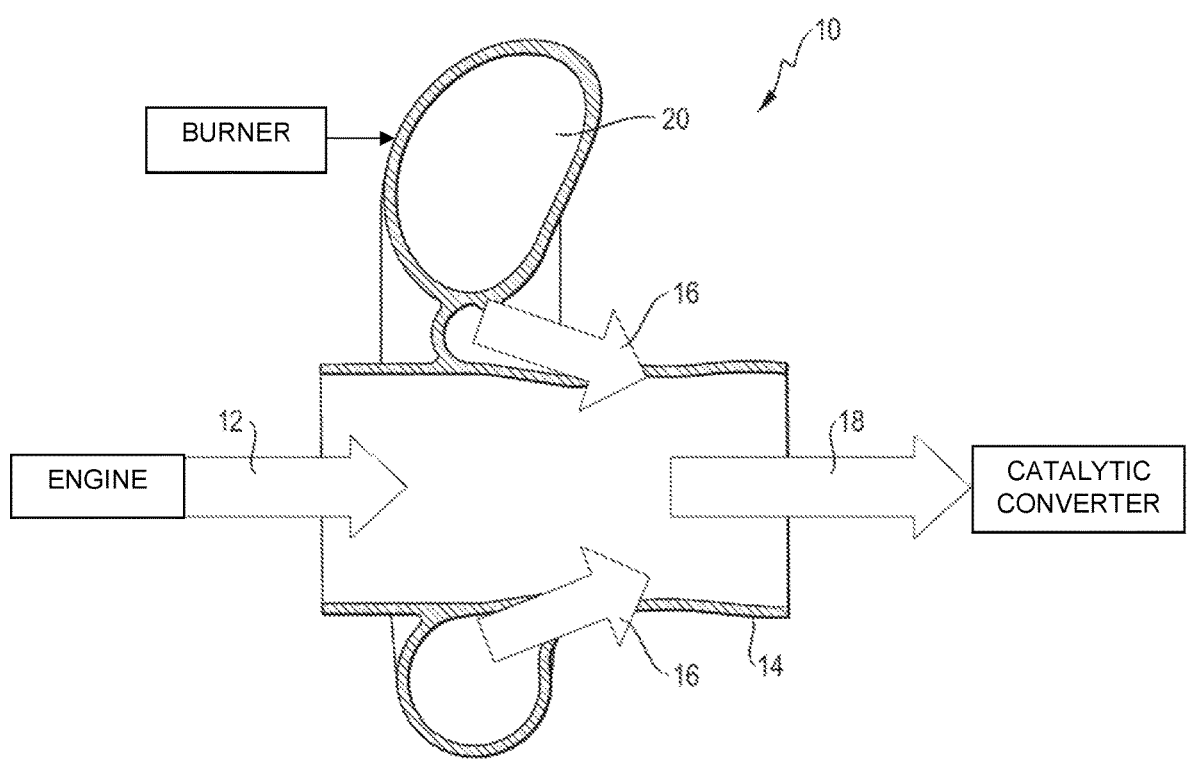

EXHAUST GAS TREATMENT SYSTEM, AND METHOD FOR HEATING AN EXHAUST GAS CATALYTIC CONVERTER

CROSS REFERENCE TO RELATED APPLICATION

This application claims priority under 35 USC 119 to German Patent Appl. No. 10 2019 106 238.1 filed on Mar. 12, 2019, the entire disclosure of which is incorporated herein by reference.

BACKGROUND

Field of the Invention

The invention relates to an exhaust gas treatment system for treating exhaust gases of an internal combustion engine of a motor vehicle. The invention also relates to a method for rapidly heating an exhaust gas catalytic converter to its light-off temperature.

Related Art

DE 40 12 411 A1 discloses mixing an exhaust gas of an internal combustion engine with a hot burner gas that comes from a separate burner to burn off particulates that are filtered in a particulate filter. To this end, the exhaust gas is fed radially via a helical inflow housing to an axially running pipe of the burner. The exhaust gas is deflected within the pipe by 90° and mixes with the burner gas. The mixture consisting of the exhaust gas and the burner gas is so hot that the particulates retained in the particulate filter can be burnt off.

An exhaust gas catalytic converter can convert noxious combustion substances in an exhaust gas of an internal combustion engine after the exhaust gas catalytic converter has been heated to its light-off temperature. There is a constant need for the light-off temperature of the exhaust gas catalytic converter to be reached as rapidly as possible in the entire exhaust gas catalytic converter.

It is an object of the invention to specify measures for rapidly heating the entire exhaust gas catalytic converter to its light-off temperature.

SUMMARY

One aspect of the invention relates to an exhaust gas treatment system for treating exhaust gases of an internal combustion engine of a motor vehicle. The system has an exhaust gas catalytic converter for the conversion of noxious combustion substances, a pipe piece that can be connected to an input side of the exhaust gas catalytic converter for feeding in exhaust gases of the internal combustion engine, and a heating line that opens into the pipe piece for feeding heating gas into the pipe piece. The heating gas is provided for heating the exhaust gas catalytic converter to the light-off temperature and is fed in as a vortex flow that rotates about a longitudinal axis of the pipe piece.

The exhaust gas can be fed to the exhaust gas catalytic converter via the pipe piece that may run in a substantially rectilinear manner in the axial direction without the exhaust gas being deflected unnecessarily. During regular operation of the exhaust gas treatment system, when the exhaust gas catalytic converter already has reached its light-off temperature, a pressure loss during the conveying of the exhaust gas from the internal combustion engine to the exhaust gas catalytic converter can be kept low. As a result, a low conveying pressure in the exhaust cycle of the internal combustion engine can be sufficient to eject the exhaust gas through the exhaust gas catalytic converter to the surroundings. Thus, an unnecessary decrease in the degree of efficiency during regular operation of the exhaust gas treatment system is avoided.

If the exhaust gas catalytic converter has not yet reached its light-off temperature, a hot heating gas produced in a burner can be fed via the heating line to the exhaust gas. A suitable routing and geometric configuration of the heating line feeds the heating gas as a vortex flow into the pipe piece that is provided for conveying the exhaust gas. As a result, the heating gas has a swirl in the pipe piece so that the heating gas rotates about the flow direction of the exhaust gas. Therefore, a gas molecule of the heating gas can experience a helical trajectory within the pipe piece. A pipe flow of the exhaust gas is, for example, substantially laminar, but boundary layers on the wall of the pipe piece can be interrupted by the vortex flow of the heating gas. This promotes particularly homogeneous mixing of the heating gas with the exhaust gas and can achieve a homogeneous temperature distribution over the flow cross section at the output of the pipe piece and at the inlet of the exhaust gas catalytic converter. As a result, the exhaust gas catalytic converter can be loaded over its entire cross section with a substantially identical temperature, thereby avoiding isolated part regions in which the light-off temperature has not yet been reached in comparison with the surrounding regions. A simple temperature measurement on an outer side of the exhaust gas catalytic converter makes valid conclusions about the temperature in the entire exhaust gas catalytic converter possible. Inhomogeneous heating of the exhaust gas catalytic converter can be avoided, and the light-off temperature in the entire exhaust gas catalytic converter can be reached with a relatively small safety margin so that the co-firing of the heating gas can be kept low. Unnecessary operation of the burner can be avoided, and fuel consumption for heating the entire exhaust gas catalytic converter to the light-off temperature can be minimized. The heating gas that is fed as a vortex flow rapidly achieves a homogeneous thorough mixing with the exhaust gas with a high degree of efficiency, thereby enabling rapid heating of the entire exhaust gas catalytic converter to its light-off temperature.

The heating line opens into the pipe piece more in a tangential manner than a radial manner. As a result, the heating gas that flows into the pipe piece does not have to be deflected by 90°, and therefore a pressure loss at the opening point is kept low. Instead, the heating gas can bear more tightly to the inner wall of the pipe piece and can trigger laminar boundary layers on the inner wall over the entire circumference of the pipe piece. The heating gas that predominantly flows in tangentially can be pressed radially to the inside by the radially oriented movement component and results in helical flow that tapers radially to the inside to produce a particularly satisfactory thorough mixing with the exhaust gas possible.

The heating line may open into the pipe piece with a component in the flow direction of the exhaust gas to achieve a vortex flow with a vortex for the heating gas. As a result, the heating gas is conveyed in the axial direction not only by the momentum of the exhaust gas, but also by the movement impetus of the heating gas upon entering the pipe piece. As a result, a correspondingly small proportion of the kinetic energy of the exhaust gas is required to accelerate the heating gas in the axial direction, thereby keeping a pressure loss low. In addition, excessively pronounced and chaotic eddying of the heating gas with the exhaust gas can be avoided, so that the extent of the mixing and a temperature profile can be predicted in an improved manner and with greater reliability.

The heating line may run helically around the pipe piece. This helical incident flow of the heating gas in the heating line imparts a significant swirl to the flow of the heating gas, and this swirl improves the mixing of the heating gas with the exhaust gas in the pipe piece.

A flow cross section of the heating line may taper in the flow direction. The tapering cross section of the heating line increases the flow speed of the heating gas and imparts a correspondingly high swirl to the flow of the heating gas.

The heating line may open via a pipe wall of the pipe piece radially from the outside into the pipe piece. Thus, a dip pipe that protrudes into the interior of the pipe piece can be avoided. In addition, the radially outwardly pointing circumferential face of the pipe piece can configure a wall side of the heating line. The pipe wall of the pipe piece can have at least one orifice opening, and preferably plural orifice openings distributed in the circumferential direction and via which the heating gas can enter through the pipe wall into the pipe piece. The orifice opening can be produced, for example, by way of a bore in the pipe wall of the pipe piece. In particular, the longitudinal direction of the orifice opening may be oriented in an angled manner with respect to the radial plane and/or the tangential plane of the pipe piece.

In one embodiment, a burner is provided for burning fuel provided for the internal combustion engine with air. The heating line may be connected to the burner for the discharge of the heating gas that is produced in the burner. The burner can use the same fuel that is provided for the internal combustion engine. The temperature and/or the volumetric flow of the heating gas can be set easily via the fuel quantity that is burned in the burner to set a desired temperature in the mixture consisting of heating gas and exhaust gas. This desired temperature enables rapid heating of the exhaust gas catalytic converter to the light-off temperature possible, without risking damage of components of the exhaust gas treatment system due to excessive thermal loading.

A further aspect of the invention relates to a method for heating an exhaust gas catalytic converter that is provided for the conversion of noxious combustion substances to its light-off temperature. The method includes mixing a heating gas into an exhaust gas that comes from an internal combustion engine and feeding the mixture to the exhaust gas catalytic converter. The heating gas is mixed into the exhaust gas as a vortex flow that rotates about the flow direction of the exhaust gas for thorough mixing with the exhaust gas. The method then causes the mixed flow to enter into the exhaust gas catalytic converter as a mixture composed of the exhaust gas and the heating gas having a temperature above the light-off temperature of the exhaust gas catalytic converter over the flow cross section. The method can be configured and developed as described in the above text on the basis of the exhaust gas treatment system. Homogeneous thorough mixing with the exhaust gas can be achieved rapidly with a high degree of efficiency by way of the heating gas that is fed in as a vortex flow to achieve rapid heating of the entire exhaust gas catalytic converter to its light-off temperature.

The mixed flow that enters into the exhaust gas catalytic converter has a substantially identical temperature over the flow cross section. The substantially homogeneous temperature distribution of the mixed flow at the inlet of the exhaust gas catalytic converter enables the exhaust gas catalytic converter to be loaded over its entire cross section with a substantially identical temperature, thereby avoiding isolated part regions, in which the light-off temperature has not yet been reached in comparison with the surrounding regions.

An exhaust gas treatment system configured and developed as described above achieves homogeneous thorough mixing with the exhaust gas in the exhaust gas treatment system rapidly with a high degree of efficiency by feeding the heating gas in as a vortex flow to ensure rapid heating of the entire exhaust gas catalytic converter to its light-off temperature.

In the following text, the invention will be described by way of example with reference to the appended drawing on the basis of one embodiment, it being possible for the features which are shown in the following text to represent one aspect of the invention both in each case individually and in combination.

BRIEF DESCRIPTION OF THE DRAWINGS

FIG. 1 is a diagrammatic sectional view of a part of an exhaust gas treatment system.

DETAILED DESCRIPTION

FIG. 1 shows part of an exhaust gas treatment system 10 where an exhaust gas 12 from an internal combustion engine can enter into a pipe piece 14 that runs in a substantially rectilinear manner. During regular operation of the exhaust gas treatment system 10, the exhaust gas 12 can leave the pipe piece 14 and can be fed to an exhaust gas catalytic converter, in which noxious combustion substances, for example hydrocarbons, carbon monoxide and/or nitrogen oxides, can be converted to form carbon dioxide and water.

The exhaust gas catalytic converter is still at ambient temperature after a cold start of the motor vehicle and must reach its light-off temperature as rapidly as possible to carry out conversions. For this purpose, a heating gas 16 is produced in a separate burner and is mixed into the exhaust gas 12 in the pipe piece 14 so that a mixed flow 18 at a considerably higher temperature in comparison with the exhaust gas 12 can leave the pipe piece 14 and can be fed to the exhaust gas catalytic converter. To this end, a heating line 20 from the burner is guided helically around the pipe piece 14, and can have a flow cross section that tapers toward the pipe piece 14. The heating gas 16 enters via orifice openings that are distributed in the circumferential direction in a pipe wall of the pipe piece 14 and predominantly enter tangentially into the pipe piece 14. In addition, the heating gas flows in an angled manner with respect to a radial plane of the pipe piece 14 in the flow direction of the exhaust gas, and enters with a rather low proportion into the pipe piece 14 radially to the inside. This results in an eddy flow that is configured as a vortex flow with a vortex for the heating gas 16 in the pipe piece, with helical trajectories for the heating gas 16 that substantially follow a conical envelope. As a result, satisfactory thorough mixing with the exhaust gas 12 can be achieved over the entire cross-sectional area of the pipe piece 14. This thorough mixing leads to a substantially homogeneous temperature distribution of the mixed flow 18 at the outlet of the pipe piece 14 and/or the inlet of the exhaust gas catalytic converter.

What is claimed is:

1. An exhaust gas treatment system for the treatment of exhaust gases of an internal combustion engine of a motor vehicle, comprising:

an exhaust gas catalytic converter for conversion of noxious combustion substances, a pipe piece connected to an input side of the exhaust gas catalytic converter for feedings exhaust gases of the internal combustion engine along a flow direction and to the exhaust catalytic converter, and a heating line that opens into the pipe piece for feeding a heating gas into the pipe piece for heating the exhaust gas catalytic converter to a light-off temperature, the heating line opening into the pipe piece at an acute angle to the flow direction of the exhaust gas and at an angle that is closer to a tangential direction of the pipe piece than a radial direction of the pipe piece so that the heating line is aligned and configured for feeding the heating gas into the pipe piece as a vortex flow that rotates about a longitudinal axis of the pipe piece and with a component of the vortex extending in the flow direction of the exhaust gas.

2. The exhaust gas treatment system of claim 1, wherein the heating line runs helically around the pipe piece.

3. The exhaust gas treatment system of claim 2, wherein a flow cross section of the heating line tapers in the flow direction.

4. The exhaust gas treatment system of claim 3, wherein the heating line opens via a pipe wall of the pipe piece from outside into the pipe piece.

5. The exhaust gas treatment system of claim 3, wherein the heating line opens into the pipe piece at plural circumferentially spaced positions.

6. The exhaust gas treatment system of claim 1, further comprising a burner for burning fuel that is provided for the internal combustion engine with air to produce the heating gas, the heating line being connected to the burner for discharging the heating gas produced in the burner.

7. The exhaust gas treatment system of claim 1, wherein a flow cross section of the heating line tapers in the flow direction.

8. The exhaust gas treatment system of claim 1, wherein the heating line opens via a pipe wall of the pipe piece from outside into the pipe piece.

9. The exhaust gas treatment system of claim 1, wherein the heating line opens into the pipe piece at plural circumferentially spaced positions.

10. A method for heating an exhaust gas catalytic converter to a light-off temperature so that the exhaust gas catalytic converter can convert noxious combustion substances, the method comprising:

generating a flow of exhaust gas from an internal combustion engine through a pipe piece in a flow direction toward the exhaust gas catalytic converter;

generating a flow of a heating gas toward the pipe piece;

introducing the heating gas into the pipe piece at plural circumferentially spaced positions upstream of the exhaust gas catalytic converter and at an acute angle to a flow direction of the exhaust gas and at an angle that is closer to a tangential direction of the pipe piece than a radial direction of the pipe piece for generating a vortex flow of the heating gas around the flow direction of the exhaust gas and thereby causing the heating gas to mix with the exhaust gas to produce a mixed flow that enters into the exhaust gas catalytic converter at a temperature above the light-off temperature of the exhaust gas catalytic converter across an entire flow cross section.

11. The method of claim 10, wherein the mixed flow that enters into the exhaust gas catalytic converter has a substantially identical temperature over the flow cross section.

* * * * *